United States Patent [19]

Ito et al.

[11] Patent Number: 4,806,721

[45] Date of Patent: Feb. 21, 1989

[54] WIRE ELECTRODE FOR WIRE-CUT ELECTRICAL DISCHARGE MACHINING

[75] Inventors: Haruhiko Ito; Yoshio Shibata; Masato Banzai, all of Aichi, Japan

[73] Assignee: Mitsubishi Denki Kabushiki Kaisha, Tokyo, Japan

[21] Appl. No.: 629,383

[22] Filed: Jul. 10, 1984

[30] Foreign Application Priority Data

Jul. 11, 1983 [JP] Japan ................... 58-125715

[51] Int. Cl.⁴ .............. B23H 1/06; B23H 7/08
[52] U.S. Cl. ................................. 219/69 W
[58] Field of Search ............ 219/69 W, 69 E; 148/12.4, 11.5 C, 143, 144, 403, 434; 164/463

[56] References Cited

U.S. PATENT DOCUMENTS

| | | | |
|---|---|---|---|
| 2,019,445 | 10/1935 | Crapo | 148/12.4 |
| 2,761,796 | 9/1956 | Wasserman | 219/69 E |
| 3,117,003 | 1/1964 | Chen | 75/164 |
| 3,577,226 | 5/1971 | Elbert et al. | 29/182 |
| 3,881,540 | 5/1975 | Kavesh | 164/463 |
| 4,046,596 | 9/1977 | Metcalfe et al. | 148/2 |
| 4,056,411 | 11/1977 | Chen et al. | 148/403 |
| 4,144,058 | 3/1979 | Chen et al. | 148/403 |
| 4,182,628 | 1/1980 | D'Silva | 148/403 |
| 4,188,211 | 2/1980 | Yamaguchi et al. | 75/170 |
| 4,287,404 | 9/1981 | Convers et al. | 219/69 W |
| 4,341,939 | 7/1982 | Briffod et al. | 219/69 W |
| 4,410,490 | 10/1983 | Ray et al. | 148/403 |
| 4,424,432 | 1/1984 | Kaneko et al. | 219/69 W |
| 4,489,136 | 12/1984 | Bose et al. | 148/403 |
| 4,532,703 | 8/1985 | Verhoeven et al. | 219/69 E |

FOREIGN PATENT DOCUMENTS

| | | | |
|---|---|---|---|
| 50479 | 4/1982 | European Pat. Off. | 148/403 |
| 659207 | 4/1938 | Fed. Rep. of Germany . | |
| 660308 | 5/1938 | Fed. Rep. of Germany . | |
| 1299977 | 7/1969 | Fed. Rep. of Germany . | |
| 2253192 | 5/1973 | Fed. Rep. of Germany . | |
| 2218098 | 10/1973 | Fed. Rep. of Germany . | |
| 2364131 | 6/1974 | Fed. Rep. of Germany . | |
| 2500846 | 1/1975 | Fed. Rep. of Germany . | |
| 2552919 | 6/1976 | Fed. Rep. of Germany . | |
| 2637432 | 3/1977 | Fed. Rep. of Germany | 219/69 W |
| 2310047 | 1/1978 | Fed. Rep. of Germany . | |
| 2914368 | 10/1979 | Fed. Rep. of Germany | 219/69 W |
| 2915765 | 11/1979 | Fed. Rep. of Germany . | |
| 2921356 | 12/1979 | Fed. Rep. of Germany | 219/69 W |
| 2824749 | 12/1979 | Fed. Rep. of Germany . | |
| 3021224 | 12/1980 | Fed. Rep. of Germany . | |
| 1587059 | 3/1970 | France . | |
| 1587060 | 3/1970 | France . | |
| 53-57119 | 5/1978 | Japan | 148/403 |
| 55-64948 | 5/1980 | Japan | 164/463 |
| 125944 | 9/1980 | Japan | 219/69 W |
| 57-85947 | 5/1982 | Japan | 219/69 W |
| 161128 | 10/1982 | Japan | 164/463 |
| 58-91155 | 5/1983 | Japan | 148/403 |
| 58-91157 | 5/1983 | Japan | 148/403 |
| 403525 | 12/1971 | U.S.S.R. | 219/69 E |

OTHER PUBLICATIONS

Szofran et al., "Electronic and Magnetic Properties of Amorphous and Crystalline $Zr_{40}Cu_{60-x}Fe_x$ Alloys*", 9/1/76, pp. 2160–2170.

S. Takayama, "Review Amorphous Structures and Their Formation and Stability", 1976, pp. 164–185.

Primary Examiner—Roy N. Envall, Jr.
Assistant Examiner—Geoffrey S. Evans
Attorney, Agent, or Firm—Sughrue, Mion, Zinn, Macpeak and Seas

[57] ABSTRACT

A wire electrode for wire-cut electrical discharge machining includes a wire composed of a core made of one of an amorphous pure metal and an amorphous alloy and a thin crystalline layer serving as a surface of the core. The wire may be coated on its surface with a layer of a material of high electrical conductivity. The amorphous alloy may be Cu-based, Fe-based, or Co-based. The use of an amorphous pure metal or alloy yields a wire electrode of much greater tensile strength than previous wire electrodes, enabling a higher machining speed.

24 Claims, 3 Drawing Sheets

WIRE ELECTRODE FOR WIRE-CUT ELECTRICAL DISCHARGE MACHINING

BACKGROUND OF THE INVENTION

The present invention relates to a wire electrode for use in a wire-cut electrical discharge machining process.

Wire electrodes for wire-cut electrical discharge machining are generally in the form of a wire of copper, brass, tungsten or the like and have a diameter in a range of from 0.05 to 0.3 mm. FIG. 1 of the accompanying drawings is illustrative of the manner in which electrical discharge machining is carried out with such a wire electrode. The wire electrode, designated at 1, is tensioned and fed along at a constant speed in the direction of the arrow A while being held in a confronting relation to a workpiece 2. Then, a machining solution 3 is applied in a direction coaxial with the wire electrode 1 while a pushed voltage is impressed between the wire electrode 1 and the workpiece 2. An electrical discharge is now repeatedly produced through the medium of the machining solution 3 across a small gap between the wire electrode 1 and the workpiece 2 to melt and scatter away an amount of material of the workpiece 2 by heat energy generated upon the electrical discharge. An XY crosstable (not shown) coupled to the workpiece 2 is numerically controlled to achieve desired relative movement between the wire electrode 1 and the workpiece 2 while keeping the electrode-to-workpiece gap constant at all times and ensuring continuous electrical discharge.

By repeating the electrical discharge and controlling the XY crosstable in the above manner, a groove 4 can be continuously cut in the workpiece 2 to machine the workpiece 2 to a desired contour. Such wire-cut electrical discharge machining has been widely used in blanking and cutting general dies, for example.

The speed of wire-cut machining is dependent on the degree of tension applied to the wire electrode 1, as shown in FIG. 2 where the abscissa indicates the tension T (g) and the ordinate the cutting speed F (mm/minute). FIG. 2 shows a characteristic curve which progressively rises as it goes to the right, the indication being that the cutting speed is higher as the tension is larger. It has been confirmed that as the tension is made larger, the wire electrode 1 is subjected to smaller vibrations and the electrode-to-workpiece gap can be controlled more uniformly for stabler electrical discharge repetitions, resulting in a higher cutting speed.

Wire electrodes of copper, brass or steel, for example, having conventional crystalline structures suffer a limitation on the tensile strength thereof, and it is not possible to achieve a higher cutting speed through an increase in tensile strength.

When a conventional wire electrode 1 of copper, brass or steel is fed along upwardly or downwardly with respect to a workpiece during machining as shown in FIG. 3, portions of the wire electrode 1 are often scattered and deposited on an upper or lower end of a groove 4 cut in the workpiece 2. The deposited material 5 is mainly composed of copper or steel, and it has been observed that the material is deposited behind the wire electrode 1 as it cuts into the workpiece 2 as illustrated in FIGS. 3A. The deposit 5 on the machined surface tends to impair the dimensional accuracy of the cut groove 4. Such a deposited layer 5 has a thickness in the range of about 10 to 100 microns in areas where large machining energy is applied. As the machining energy is increased, the cut groove 4 is sometimes filled with the deposited material as shown in FIG. 4.

This undesirable phenomenon results in various drawbacks. The workpiece having been machined cannot be removed from the wire electrode. During machining, the machining solution 3 ejected coaxially with the wire electrode 1 does not enter the electrode-to-workpiece gap, causing a gaseous electrical discharge to lower the cutting speed and resulting in a danger of breaking the wire electrode 1. The deposit 5, mainly of copper, iron or the like, can only be removed with a dangerous chemical such as fuming nitric acid, a procedure which is tedious, time-consuming, and dangerous.

Therefore, conventional wire electrodes have suffered from many drawbacks and have proven unsatisfactory.

SUMMARY OF THE INVENTION

The present invention has been made in view of the above-discussed drawbacks of the conventional electrodes.

It is an object of the present invention thus to provide a wire electrode which has a high tensile strength, results in the deposition of no appreciable amount of its own material on a workpiece, and can machine a workpiece at an increased speed and a high accuracy.

The wire electrode of the invention comprises a wire made of an amorphous pure metal or an amorphous alloy having an increased tensile strength. Although amorphous metal generally has a low electric conductivity, the wire can be crystallized only at its surface to compensate for the lowered conductivity while preventing the tensile strength of the amorphous metal wire from being substantially reduced. If the amorphous metal wire were made solely of a copper-base material or an iron-base material, some portion thereof would be scattered and deposited on the workpiece during a machining operation. However, by coating its surface with zinc, magnesium, tin, lead, aluminum, cadmium or alloys thereof, the wire electrode has a high tensile strength, deposits no appreciable amount of its material on the workpiece, and can machine a workpiece at an increased speed and a high accuracy.

The inventor has produced a thin amorphous wire by quenching a pure metal or an alloy in a molten state by a super-quenching process, such as a spinning processing, for producing a thin amorphous wire in a rotating liquid layer. The rate of quenching the metal or alloy is preferably in the range of $10^5$ to $10^6$ °C./sec. The produced thin amorphous wire may be used directly as a wire electrode, or may further be drawn into a wire electrode. The inventor has found that the resultant wire electrode has a tensile strength much higher than that of the prior wire electrodes.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1A:
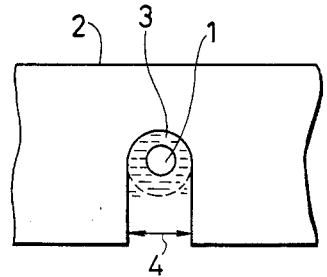
FIGS. 1A and 1B are diagrams showing a wire-cut electrical discharge machining process using a conventional wire electrode.
Figure 1B:
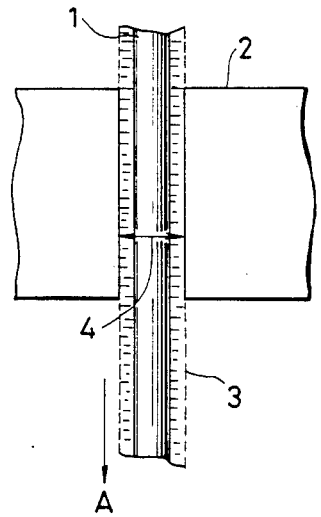
Figure 2:
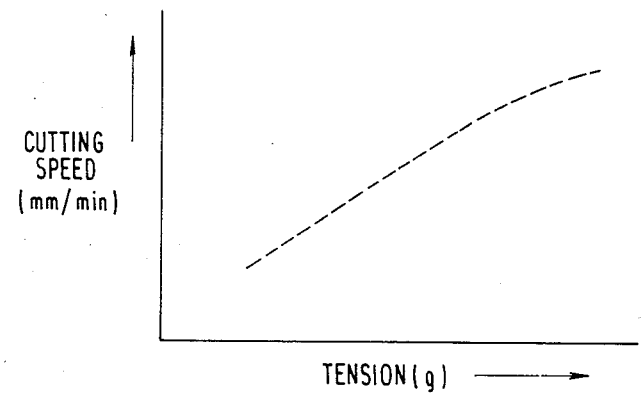
FIG. 2 is a diagram showing the relationship between wire electrode tension and cutting speed.
Figure 3A:
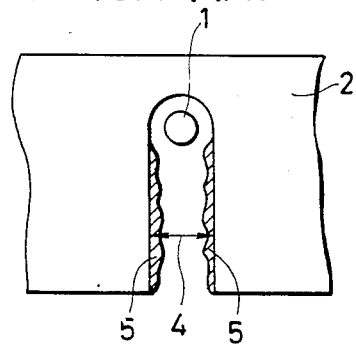
FIGS. 3A, 3B, 4A and 4B are diagrams showing the manner in which the material of conventional wire electrodes is deposited on surfaces of workpieces being machined.
Figure 3B:
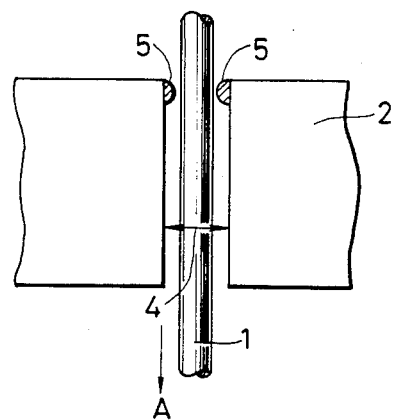
Figure 4A:
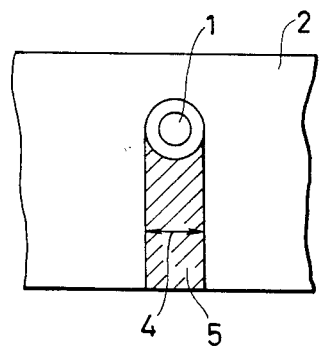
Figure 4B:
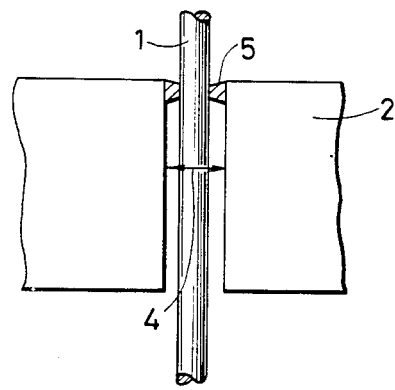
Figure 5A:
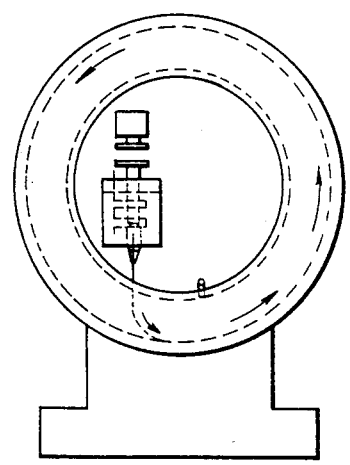
FIGS. 5A and 5B are schematic views of a spinning device using a rotating liquid layer for producing a wire electrode according to the present invention.
Figure 5B:
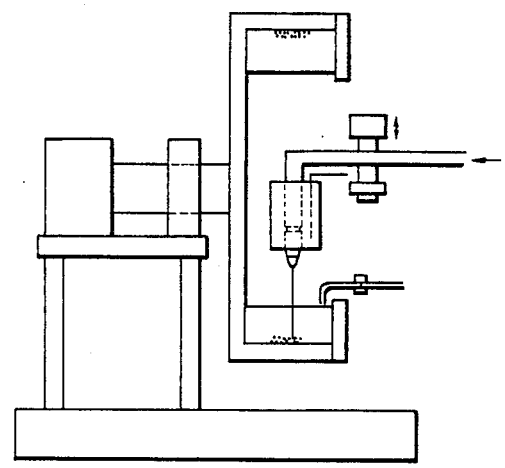

FIGS. 5A and 5B schematically show a spinning device for forming an amorphous wire in a rotating liquid layer, the spinning device being generally composed of a heating furnace, an ejector for ejecting molten metal, and a cooling unit for cooling a rotating drum. The rotating drum has an inside diameter of 600 mm and, when rotated, forms a uniform rotating layer of water on an inner periphery of the drum. The molten metal is ejected in the same manner as that conventionally employed in forming an amorphous ribbon, but is ejected through a nozzle having a circular cross section. The spinning process continuously forms an amorphous wire which is accummulated in cooling water in the drum, the amorphous wire thus fabricated having a diameter ranging from 100 to 200 microns for an iron-based metal.

Figure 6A:
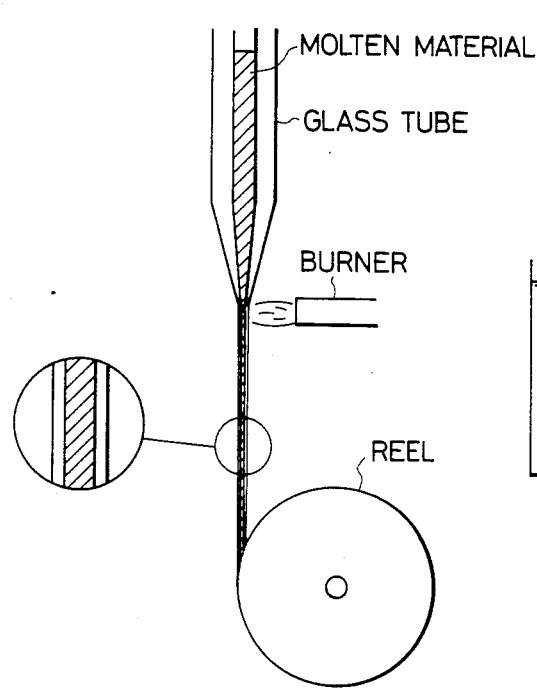
FIGS. 6A and 6B are schematic views of other spinning devices for producing a wire electrode coated with glass according to the present invention.
Figure 6B:
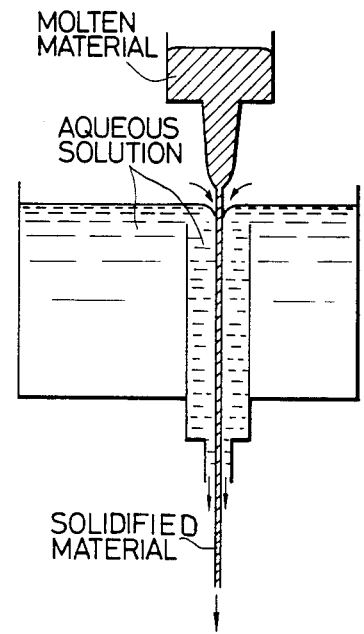

Other super-quenching processes include a spinning process for forming an amorphous wire in a water stream and a spinning process for forming an amorphous wire coated with glass, as shown in FIGS. 6A and 6B, respectively.

Figure 7:
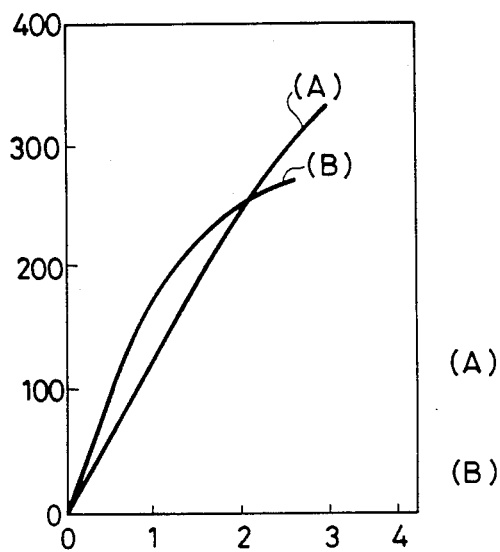
FIG. 7 is a diagram showing stress vs. strain curves of an amorphous wire and a piano wire.

Amorphous metal wires generally have a tensile strength which is 1.5 to 3 times that of crystalline metal wires. As an example, FIG. 7 illustrates stress vs. strain curves of an amorphous-metal wire ($Fe_{75}Si_{10}B_{15}$) (curve A) and a conventional piano wire (curve B).

Generally, a metal material which is converted into an amorphous structure has an increased electrical resistance, and such a tendency is especially great with transition metals. Such metals are thus not preferred for use as wire electrodes for wire-cut electrical discharge machining. An amorphous metal wire having a thin crystalline surface layer is, however, capable of maintaining the good mechanical characteristics (increased tensile strength) achieved by the amorphous construction and of increasing the electric conductivity of the wire.

Wire electrodes can also be made of copper or a copper-base alloy. Where an amorphous wire electrode is made of copper-base metal, part of the wire electrode will be scattered and deposited on a machined surface of a workpiece due to the electrical discharge. This is true for a steel-base wire electrode, and the tendency is greater where the wire surface is a thin crystalline layer.

To prevent the electrode material from being scattered and deposited, an amorphous wire electrode 6 (FIG. 8) is coated on its surface with a layer 7 of a metal having a low melting point and which is capable of being easily evaporated, such as zinc, magnesium, tin, lead, aluminum, cadmium or alloys thereof. The wire electrode thus fabricated will produce substantially no deposit on the workpiece.

Figure 8:
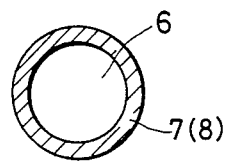
FIGS. 8 and 9 are cross-sectional views of wire electrodes according to the present invention.

The amorphous metal wire electrode thus fabricated by super-quenching a molten metal has a tensile strength which is 1.5 to 3 times that of conventional crystalline-metal wire electrodes. Since the tension applied to the amorphous metal wire electrode can be increased in actual machining operations, the machining rate or speed can be increased and the machining accuracy also improved. To increase the inherent low electrical conductivity of an amorphous metal material, the surface of the amorphous metal wire is heated by a high-frequency heating device, for example, to crystallize a thin layer on the surface to thereby attain a desired electric conductivity. The resultant wire electrode is of a double-layer construction having an amorphous wire core 6 and a thin crystalline surface layer 8 as illustrated in FIG. 8. The wire electrode thus formed has both a desired high tensile strength and a desired high electrical conductivity. The surface of the amorphous metal wire may also be heated by a high-temperature bath, laser, or gas burner, for example.

If the amorphous metal wire electrode is made primarily of copper, part of the wire electrode will be deposited on the workpiece during machining. To prevent such deposition, the surface of the wire electrode may be coated with a metal such as zinc, magnesium, tin, lead, aluminum, cadmium, or alloys thereof. The surface-coated wire electrode produces no deposition on a workpiece, and can machine a workpiece with an increased machining accuracy and at a high rate.

Table 1 shows a comparison of various characteristics of a conventional wire electrode of brass plated with a coating layer of zinc about 10 microns thick, a wire electrode of brass, and a wire electrode of copper, the characteristics being obtained when machining a steel workpiece and indicated by way of percentage with brass characteristics used as a reference. Table 1 clearly indicates that the zinc coating layer is highly effective in reducing the unwanted wire material deposit and increasing the machining speed. It is thus apparent that the advantage of the coating layer remains the same when the electrode core is an amorphous metal wire.

TABLE 1

| Wire electrode material | Diameter (mm) | Coating thickness (microns) | Deposit | Tensile strength | Machining speed |
| --- | --- | --- | --- | --- | --- |
| Brass | 0.2 | — | 100 | 100 | 100 |
| Copper | 0.2 | — | 700 | 50 | 80 |
| Zinc-coated brass | 0.2 | 10 | 5–8 | 75 | 180 |

The amorphous wire electrode of the present invention, having a core of an amorphous metal and a thin crystalline surface layer, may be made of any metal that can be in an amorphous state. Metals and alloys that can be used to prepare amorphous wires of the invention include:

1. Pure metal or alloys of pure metals;
2. Iron, aluminum, magnesium, copper, cobalt, niobium and alloys thereof;

3.

Iron-base alloy (alloy composed mainly of iron),
copper-base alloy (alloy composed mainly of copper), and cobalt-base alloy (alloy composed mainly of cobalt);

4.

Fe - Si - B alloy,
Fe - P - C alloy (Fe - P - C - Cr alloy), and
Fe - Co - Si - B alloy;

Cu - Zr alloy,
Cu - Sn - P alloy, and
Cu - Zn - Ag alloy;

Co - Nb - B alloy, and
Co - Fe - Si - B alloy;

5.

Fe=70–75%, Si=10%, B=15–20%
Fe=72–77.5%, P=12.5%, C=10% (Cr=0–5.5%), and
Fe=71%, Co=4%, Si=10%, B=15%;

Cu=60%, Zr=40%,
Cu=65–70%, Zn=20–25%, Ag=5–15%, and
Cu=70–80%, Sn=10–20%, P=0–10%;

Co=67.5%, Fe=5%, Si=12.5%, B=15%.

Figure 9:
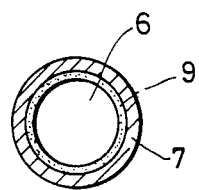

Since the wire electrode should be of good conductivity, the amorphous wire electrode may be coated with an electrically conductive material. FIG. 9 shows such a multilayer amorphous wire electrode composed of an amorphous wire electrode 6, a layer 8 of electrically conductive material coated on the amorphous wire electrode 6, and a layer 7 of a metal such as zinc, magnesium, tin, lead, aluminum, cadmium, or alloys thereof coated on the layer 8 for preventing the electrode material from being scattered and deposited on the workpiece being machined. The multilayer amorphous wire electrode can machine workpieces at an increased machining accuracy and speed.

Other advantages of the amorphous wire electrode than improved tensile strength are as follows:

By adding a passive film element such as Cr, the corrosion resistance can greatly be increased. Where a wire electrode is made of an amorphous metal alloy only with no surface coating, the fabricated wire electrode can be packaged with a simple process. Under current practice, wire electrodes made of brass must be packaged by vacuum packaging. However, the amorphous wire electrodes of the invention can be packaged more easily. That is, in general, amorphous wire electrodes with no passive film formed thereon have a surface which is highly chemically active. But by coating such an electrode surface with Zn or the like, a strong and stable bond is formed between the electrode surface and the coating, thereby rendering the surface of the wire chemically inactive and obviating the need for vacuum packing.

Advantages in the manufacturing process of the wire electrode of the invention are as follows: Wire electrodes can be fabricated simply by injecting a molten metal material and super-quenching it. It is not necessary therefore to repeat conventional wire drawing processes to form a thin wire. Accordingly, the manufacturing process needed to fabricate the wire electrode of the invention is quite simple and the time required for manufacturing the wire electrode is short.

Although certain preferred embodiments have been shown and described, it should be understood that many changes and modifications may be made therein without departing from the scope of the appended claims.

We claim:

1. In an electrical discharge machining (EDM) apparatus for machining a workpiece, said apparatus comprising a pulsed voltage source and an EDM electrode, said pulsed voltage source applying a pulsed voltage between said EDM electrode and said workpiece to machine said workpiece, the improvement wherein said EDM electrode comprises: a wire composed of a core consisting of an amorphous alloy, said amorphous alloy containing at least two of iron, aluminum, magnesium, copper, cobalt and niobium, and a thin crystalline surface layer around said core.

2. The EDM according to claim 1, wherein said wire is drawn into a thin wire.

3. The EDM apparatus according to claim 1, further comprising a layer of a material having a high electrical conductivity coated on said surface of said wire.

4. The EDM apparatus according to claim 3, wherein said material having a high electrical conductivity is one of copper and silver.

5. The EDM apparatus according to claim 1, wherein said amorphous alloy is composed primarily of iron, and said EDM electrode further comprises a thin crystalline surface layer around said core.

6. The EDM apparatus according to claim 5, wherein said alloy comprises an Fe - Si - B alloy.

7. The EDM apparatus according to claim 6, wherein Fe=70–75%, Si=10% and B=15–20%.

8. The EDM apparatus according to claim 5, wherein said alloy comprises an Fe - P - C alloy.

9. The EDM apparatus according to claim 8, wherein Fe=72–77.5%, P=12.5% and C=10%.

10. The EDM apparatus according to claim 9, wherein said alloy further contains Cr=0–5.5%.

11. The EDM apparatus according to claim 5, wherein said alloy comprises an Fe - Co - Si - B alloy.

12. The EDM apparatus according to claim 11, wherein Fe=71%, Co=4%, Si=10% and B=15%.

13. The EDM apparatus according to claim 1, wherein said amorphous alloy is composed primarily of copper.

14. The EDM apparatus according to claim 13, wherein said alloy comprises a Cu - Zr alloy.

15. The EDM apparatus according to claim 14, wherein Cu=60% and Zr=40%.

16. The EDM apparatus according to claim 13, wherein said alloy comprises a Cu - Sn - P alloy.

17. The EDM apparatus according to claim 16, wherein Cu=70–80%, Sn=10–20%, and P is present in an amount not exceeding 10%.

18. The EDM apparatus according to claim 13, wherein said alloy comprises a Cu - Zn - Ag alloy.

19. The EDM apparatus according to claim 18, wherein Cu=65–70%, Zn=20–25% and Ag=5–15%.

20. The EDM apparatus according to claim 1, wherein said amorphous alloy is composed primarily of cobalt.

21. The EDM apparatus according to claim 20, wherein said alloy comprises a Co - Nb - B alloy.

22. The EDM apparatus according to claim 20, wherein said alloy comprises a Co - Fe - Si - B alloy.

23. The EDM apparatus according to claim 22, wherein Co=67.5%, Fe=5%, Si=12.5% and B=15%.

24. EDM apparatus according to claim 1, wherein said wire is coated on its surface with a metal selected from the group consisting of zinc, magnesium, tin, lead, aluminum, cadmium and alloys thereof.

* * * * *